Aug. 18, 1970   C. E. STUDEN   3,524,647
METHOD OF MAKING AN EXPANDED POLYETHYLENE DART BOARD
Original Filed April 6, 1964   2 Sheets-Sheet 1
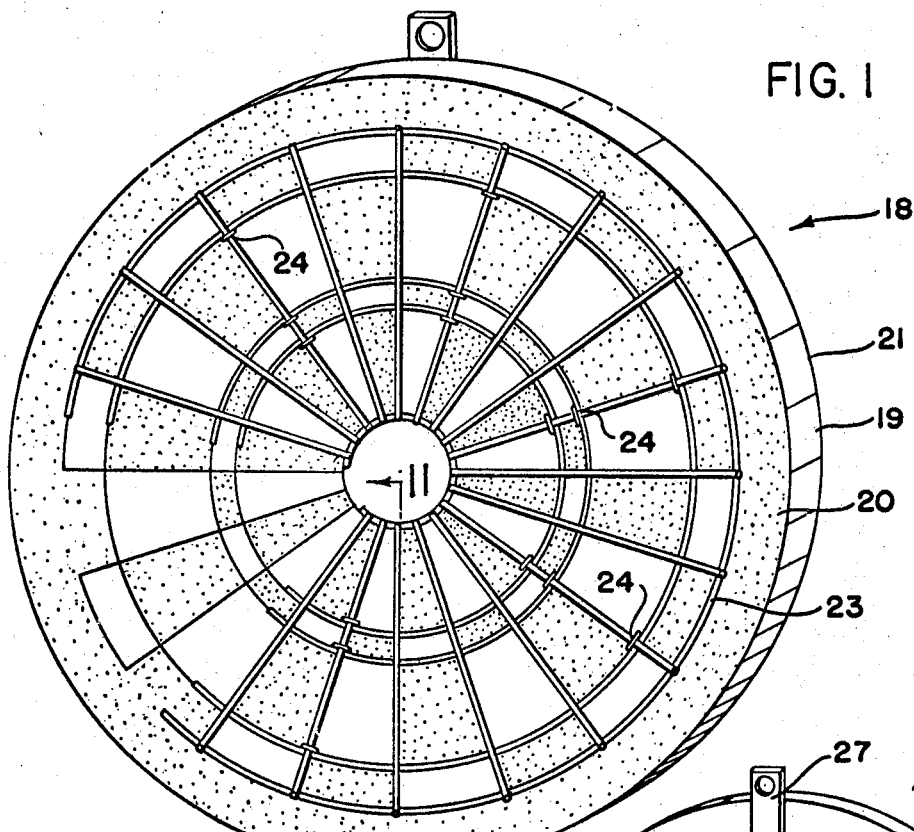
FIG. 1
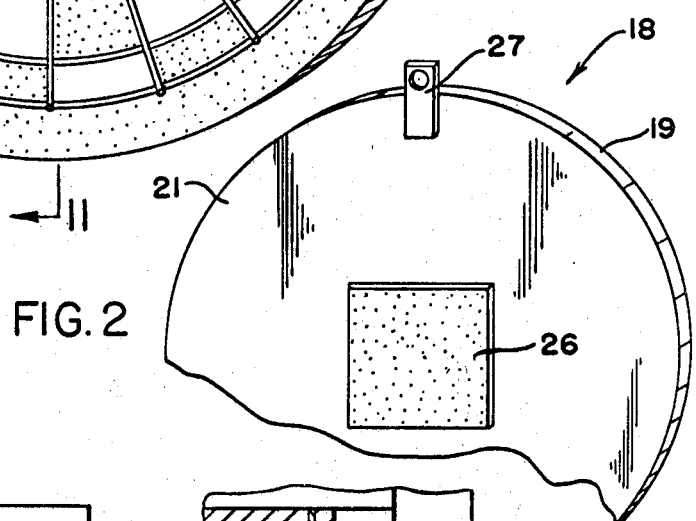
FIG. 2
FIG. 3
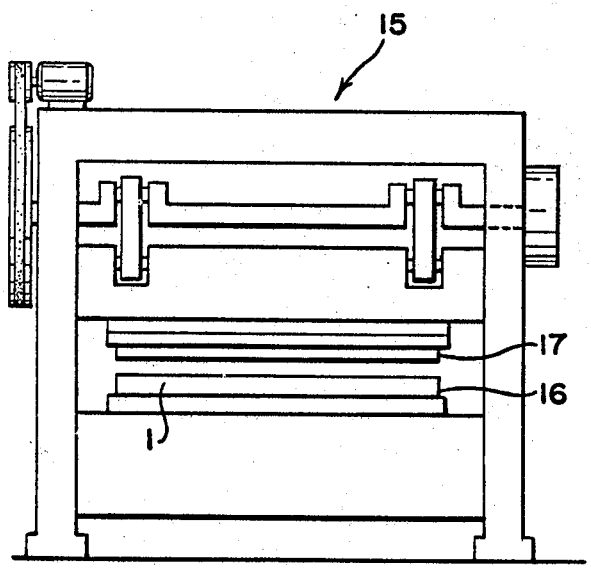
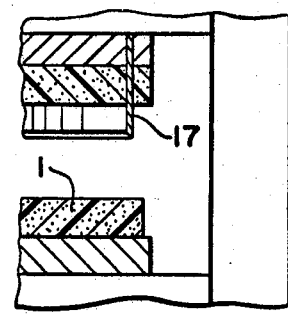
FIG. 4
INVENTOR.
CHARLES E. STUDEN
BY
*Fay, Sharpe & Mulholland*
ATTORNEYS

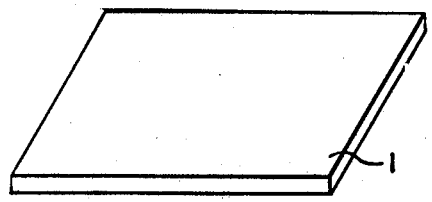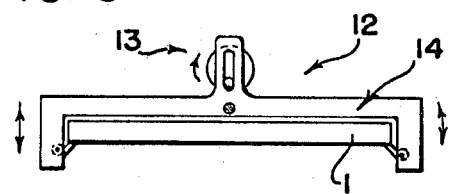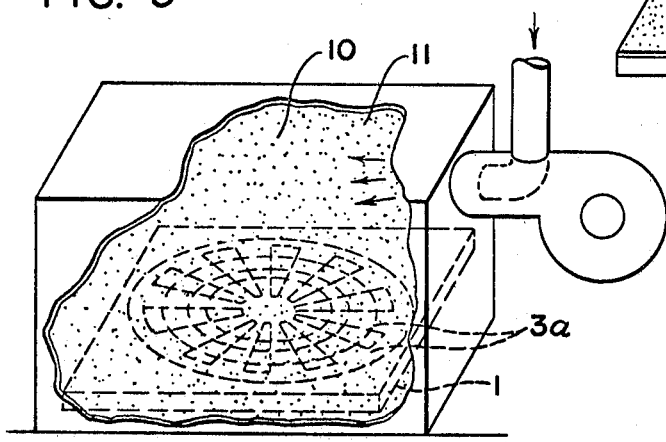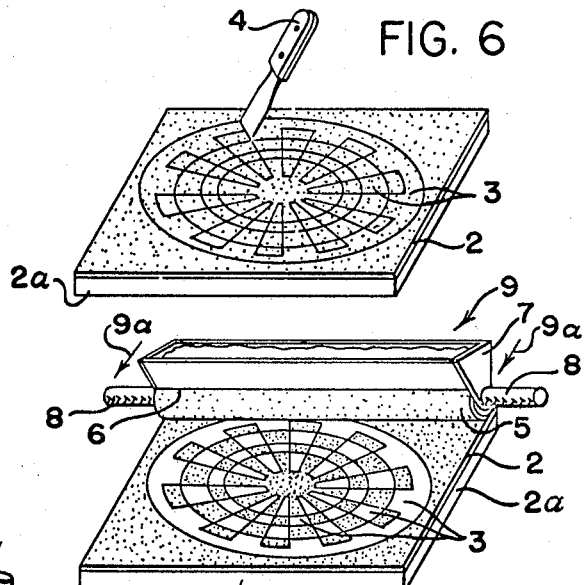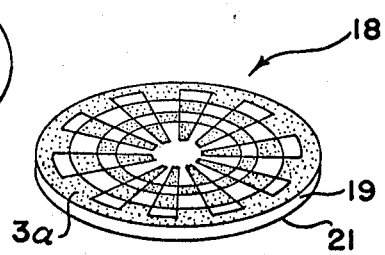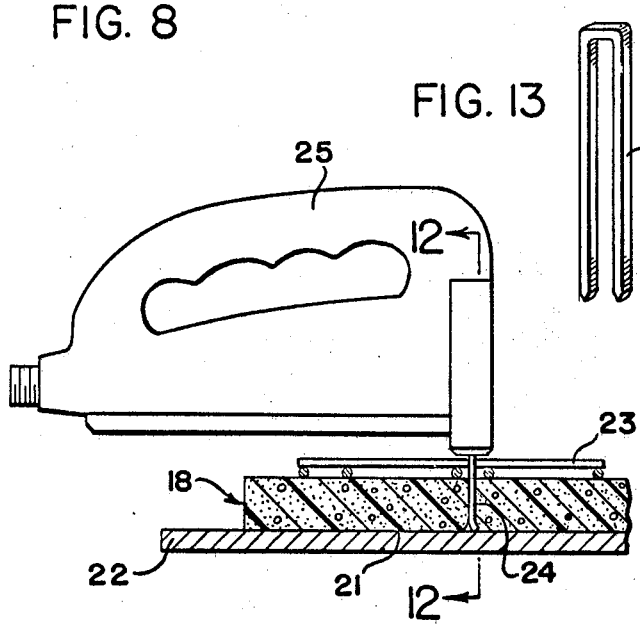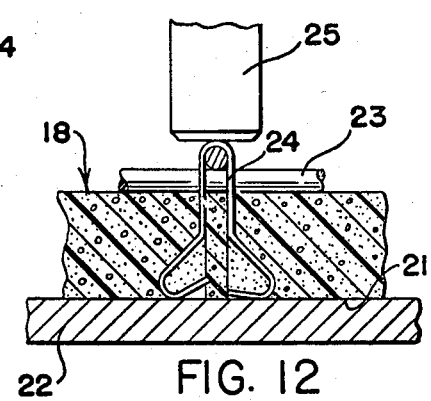

United States Patent Office 3,524,647
Patented Aug. 18, 1970

3,524,647
METHOD OF MAKING AN EXPANDED POLYETHYLENE DART BOARD
Charles E. Studen, R.D. 1, Pekin Road, Newbury, Ohio 44065
Original application Apr. 6, 1964, Ser. No. 357,456, now Patent No. 3,409,301, dated Nov. 5, 1968. Divided and this application Aug. 2, 1968, Ser. No. 752,448
Int. Cl. F41j 3/00
U.S. Cl. 273—102        8 Claims

ABSTRACT OF THE DISCLOSURE

A method of making a dart board of expanded polyethylene with a cellular memory. A screen is laid on an expanded polyethylene blank, the screen having porous and nonporous areas. Applying an adhesive to the blank through the screen, removing the screen, uniformly depositing shredded material on the blank and shaking the blank, whereby loose material is removed and part of the shredded material is secured to the blank by the adhesive. The blank is then trimmed to a desired configuration and the trimmed blank is placed adhesive side down. A wire lattice conforming in shape to the outlines of the clumps of adhered shredded material is then fastened to the blank. A different target pattern may be formed on the opposite side of the board by similar method stops.

---

This is a division of application Ser. No. 357,456, filed Apr. 6, 1964, now Pat. No. 3,409,301.

This invention concerns a dart game utilizing an expanded polyethylene target. The game involves propelling pointed, finned projectiles toward a flat-surfaced member having suitable skill measuring indicia thereon.

In the broadest sense, a dart board constructed according to the principles of this invention consists of an expanded polyethylene blank with substantially parallel front and back faces and a plurality of designated areas on at least one of said faces.

Suitable indicia are provided to define these designated areas by color, numerals, letters, geometric shapes or words, which are prescribed by the game to be played. These indicia may be applied to the expanded polyethylene blank by a suitable flock coating method. A wire lattice may be fastened to the polyethylene blank to substantially outline these designated areas. The wire may be fastened to clarify scoring. A pressure-sensitive tape or conventional support member is provided to suspend the board in projectile receiving position.

In general, the advantages of the dart board of the instant invention lie in its ability to resist damage due to cellular memory properties. Over a period of time a great number of darts may be thrown at the novel target of this invention with little permanent damaging effect. Consequently, even though a great number of holes are made in the dart board, it will retain its structural integrity and distinct indicia definition. After removal of the projected darts from the face of the target, the punctured cells of the polyethylene board return to their original shape and the board retains its basic substrate characteristics due to the cellular structure of polyethylene. Accordingly, this invention provides a dart board having a substantially increased life over prior art target devices.

An additional advantage of the polyethylene dart board of the instant invention is the ease and economy with which it may be manufactured.

A further advantage of the polyethylene dart board of the instant invention is its lightness of weight which substantially reduces shipping and handling costs and facilitates mounting for use.

More specifically, the board may be hung easily at any location with a double-faced pressure-sensitive tape on the side opposite the indicia which will not necessitate inserting an object in the wall, or otherwise marring or scratching the wall surface. The use of pressure sensitive tape further eliminates rotation of the dart board about a point of suspension connecting the dart board to a wall fixture. A limitation as to the minimum weight of prior art dart boards has been assured because of a known tendency for lightweight boards to bounce away from the wall after being hit by a dart. By using a pressure-sensitive tape, this problem is alleviated and the mounting of a lightweight board made feasible.

A further advantage of a dart board made from a polyethylene blank lies in the fact that the darts may be stored by sticking them in the peripheral edge of the dart board in order to protect the tips and keep the darts out of the way.

Prior art dart boards have presented a multitude of problems in that they are traditionally manufactured from materials, such as wood, cork, and spirally wound paper tape, and consequently do not have the cellular memory properties of expanded polyethylene. Thus, when used for a relatively short period of time, the boards become soft and mushy in certain areas and lose their ability to retain darts in these areas.

The object of this invention is to provide an economical method of manufacturing an expanded polyethylene dart board comprising the steps of laying a silk screen having designated porous and nonporous areas over a blank, distributing an adhesive on the silk screen, removing the silk screen, placing the blank in a uniform atmosphere of dust flock, allowing the blank to obtain a uniform layer of dust flock, drying the adhesive, shaking off the excess dust flock in areas where no adhesive was applied, and the final step of piercing the blank with a circular die and stripping the excess peripheral material from the circular blank formed by the circular die, and finally attaching a wire lattice to the correspondingly designated flock-coated face of the blank by positioning the wire lattice in a manner to outline substantially the flock-coated divisions, fastening the wire lattice to the expanded polyethylene blank with at least one staple.

Other and more specific objects of the invention will be apparent from the detailed description to follow.

In the drawings:

FIG. 1 is a front perspective view of the dart board constructed according to the principles of this invention.

FIG. 2 is a fragmentary rear perspective view of the dart board of FIG. 1 illustrating the alternative mounting means.

FIG. 3 is an end elevational view of a punch press and die arrangement for forming the circular dart board blank.

FIG. 4 is an enlarged fragmentary view of a portion of the press and die of FIG. 3.

FIG. 5 is a perspective view of an expanded polyethylene blank.

FIG. 6 is a perspective view of a silk screen for use in producing the dart board of FIG. 1.

FIG. 7 is a perspective view of the silk screen of FIG. 6 being used on the blank of FIG. 5.

FIG. 8 is a schematic fragmentary perspective view of a coating step during the manufacture of the dart board of FIG. 1.

FIG. 9 is a schematic side elevational view of a step in the manufacturing of the dart board which follows the coating step illustrated in FIG. 8.

FIG. 10 is the product of the procedure illustrated by FIGS. 5 through 9.

FIG. 11 is a front elevational view partially in section illustrating the lattice attachment step.

FIG. 12 is a fragmentary view illustrating the completion of the operation of FIG. 11.

FIG. 13 is a perspective view of the fastener illustrated in the procedure of FIGS. 11 and 12.

In the embodiment illustrated in FIG. 1, a dart board is provided having alternate plain and flock-coated areas.

The board of FIG. 1 may be produced by a method illustrated in FIGS. 3–12 in which a silk screen mat 2 is formed and placed in register on a mounting board 2a. This layer of silk screen mat 2 is coated with a nonporous adhesive film such as a layer of epoxy resin. In certain designated areas 3 this nonporous coating is removed for example, by a knife 4. These designated areas 3 are formed in a manner to define and designate specific areas whose size and shape are defined by the scoring technique of the particular dart board game. Consequently, the position of the binder determines the position of the numerals, letters, geometric shapes or words as predescribed by the game to be played. In the areas where the nonporous film is removed, the certain designated porous screen areas 3 remain and thus the silk screen 2 has become a functional template.

The silk screen mat 2 is then superimposed on the polyethylene blank 1 and held thereon by retaining means such as a conventional clamp, or pressure-sensitive tape. The adhesive is then distributed on the silk screen by any conventional means 9, such as, for example, a roller 5 having a reservoir 7 of binder which seeps through an opening 6 at the bottom of the reservoir in a uniform flow pattern over the roller 5 to the screen 2. This mechanism is pulled across the silk screen as shown by the liner or motion 9a by any conventional driving means, for example, a pair of handles 8 manually operated. Thus, with one stroke of this mechanism 9, the binder is applied to the polyethylene blank through the porous openings 3 of the silk screen 2. The silk screen 2 is then removed with the binder in position on the expanded polyethylene blank 1 in areas 3a corresponding to those areas 3 on silk screen 2.

The expanded polyethylene blank 1 with the binder in its desired positions is placed in a uniform atmosphere 10 which may, for example, be maintained by electrical or mechanical means. This atmosphere is composed of a gas and a particulate material 11 such as shredded nylon or viscose rayon; and thus, a uniform coating of this particulate material 11 is applied. The blank is then removed from the uniform atmosphere of shredded particles and left to dry.

After the binder on the polyethylene blank is completely dried and the shredded particles are fixedly bound to the polyethylene blank, the blank is placed in a shake-out machine 12 where the loose shredded nylon or viscose rayon is shook off. The shake-out machine may consist of a driving means 13 and a driven vibrating bed 14 in which the blank 1 is mounted in a fixed position with respect to the bed by some retaining means.

After the loose particles are removed, the expanded polyethylene blank is formed into a circular dart board by placing the blank 1 in the press 15 at position 16. The annular punch or die 17 descends and punches the blank 1 to produce the circular dart board.

The excess peripheral material is then removed from the circular dart board, and the circular blank 18 remains with substantially parallel sides and coated divisions and designated areas on one of the sides, as shown in FIG. 10.

The blank 18 is then placed on a steel plate 22 in a manner such that side 21 of blank 18 is in contact with the steel plate 22. Wire lattice 23 is then laid on the expanded polyethylene blank 18 in a manner which aligns the concentric circles of the wire lattice 23 concentric with the circular edge 19 of the circular blank 18 and substantially outlining the designated areas 3a. Fastening means such as the pressurized air stapler 25 is positioned in the desired stapling position with the fastener 24 contained within the gun. The stapler is actuated and drives the staple 24 around a portion of the wire lattice 23 and through the expanded polyethylene blank 18. Striking the steel plate and deforming on the underside of the polyethylene blank, the staple 24 is deformed in an arbitrary shape such as the shape of the staple in FIG. 12. This stapling may be performed in an arbitrary number of places with the staple deforming in an arbitrary manner in each case.

A pressure-sensitive tape 26 may then be applied by peeling the protective paper from one side of the tape and placing this peeled side on the rear of the dart board side 21. The tab 27 could be applied by an adhesive means, such as a rubber cement, or a pin through the top center position of the dart board. It is to be understood that both mounting means are not required and may be omitted. The finished product shown in FIG. 1 is then obtained.

When the dart board is in use the cellular memory construction of expanded polyethylene will assure long life. This cellular memory works in the following manner. When the dart punches the expanded polyethylene, certain cells are punched and separated as the dart tip passes through; and consequently, the dart is frictionally retained by pressure of the cells as a result of their memory for their former position. When the dart tip is removed from the polyethylene dart board, the cells resume their previous shape and position due to their memory and are closed cells no longer. They retain firm qualities that would not generally be expected after a great number of punctures.

Further, such a dart board in very inexpensive to transport since it is lightweight and can be handled easily. The dart storage feature also is an additional advantage in that the darts may be stored in the peripheral edges of the dart board so that they do not protrude from the plane of the stationary wall on which the dart board is mounted. This results in a safety feature which protects both the dart board user and the dart tips.

The lightweight construction is also an additional safety feature in that when being used by a child, it may drop on the child with substantially no harm. It is also relatively indestructible over prior art devices in that it is very resilient and is substantially impervious to water.

Other embodments could include a polyethylene-faced plywood dart board with a sheet of polyethylene over a plywood base member which is supported by a fixed wall.

It is to be understood that the circular shape, numerals and the flock coating design of the specific embodiment is not to be restrictive. It is easily seen that such a dart board blank could be in the shape of a square, rectangle, hexagon, octagon or other geometric configuration as set forth by the dart game to be played, such as dart board baseball, football, basketball, etc. Thus, the designated portions would not always be arcuate but of a geometric configuration prescribed by the specific game.

A further embodiment would include performing the flock coat and wire lattice operations to both sides of the expanded polyethylene blank so that two games could be included on one dart board having a cellular memory. This dart board could be turned around and two completely different games played.

For ease of description the principles of the invention have been set forth in connection with but a single illustrated embodiment showing a dart board. It is not my intention that the illustrated embodiment, nor the terminology applied in describing it be limiting inasmuch as variations can be made without departing from the spirit of the invention. Rather, I desire to be restricted only by the scope of the appended claims.

I claim:

1. A method of manufacturing a circular expanded polyethylene dart board comprising the steps of laying a screen having porous and nonporous areas on an expanded polyethylene blank, applying a binder, removing said screen, applying a shredded material to the blank in a uniform manner, shaking the expanded polyethylene blank to remove the loose particles, shearing the blank to a desired shape, removing the peripheral material, placing the flock-coated circular expanded polyethylene blank with the flock-coated side upward and with the plain side in contact with a steel plate, laying a wire lattice on the flock-coated side to substantially outline said flock-coated divisions with the portions of said wire lattice concentric with the expanded polyethylene blank, and fastening said wire lattice to said flock-coated expanded polyethylene blank by at least one fastener.

2. The method of claim 1 including the step of applying pressure-sensitive tape to the plain side of the blank.

3. The method of claim 1 including the step of removing part of the applied binder from the blank with a knife.

4. The method of claim 1 wherein the binder is applied to the blank by rolling it on.

5. The method of claim 1 including the step of placing the blank in a uniformly maintained atmosphere where the shredded material is applied.

6. The method of claim 1 wherein the shredded material is synthetic resin.

7. The method of claim 1 including the step of attaching the blank to a rigid substrate.

8. The method of claim 1 further including the steps of laying a second screen on the plain side of the blank, said second screen having porous and nonporous areas arranged in a pattern different from that used on the other side of the blank, removing said second screen, applying a shredded material to the plain side of the blank in a uniform manner, and shaking the blank to remove the loose particles.

References Cited
UNITED STATES PATENTS

| | | | |
|---|---|---|---|
| 2,688,304 | 9/1954 | Miran | 117—25 X |
| 2,818,259 | 12/1957 | Arenson. | |
| 3,409,301 | 11/1968 | Studen. | |

FOREIGN PATENTS

| | | |
|---|---|---|
| 506,345 | 5/1939 | Great Britain. |
| 611,969 | 11/1948 | Great Britain. |

OTHER REFERENCES

Brenner, Walter: Foam Plastics, Manual No. 127, pp. 177–192.

ANTON O. OECHSLE, Primary Examiner

M. R. PAGE, Assistant Examiner

U.S. Cl. X.R.

117—25